(12) United States Patent
Feller

(10) Patent No.: US 7,823,463 B1
(45) Date of Patent: *Nov. 2, 2010

(54) ULTRASONIC FLOW SENSOR USING TWO STREAMLINED PROBES

(76) Inventor: Murray F Feller, 21577 NW. 75th Avenue Rd., Micanopy, FL (US) 32667

( * ) Notice: Subject to any disclaimer, the term of this patent is extended or adjusted under 35 U.S.C. 154(b) by 0 days.

This patent is subject to a terminal disclaimer.

(21) Appl. No.: 12/626,890

(22) Filed: Nov. 28, 2009

(51) Int. Cl.
*G01F 1/66* (2006.01)
(52) U.S. Cl. .................................. 73/861.27
(58) Field of Classification Search . 73/861.26–861.29, 73/597, 598, 602, 610

See application file for complete search history.

(56) References Cited

U.S. PATENT DOCUMENTS

| 5,440,937 A | * | 8/1995 | Lynnworth et al. | 73/861.29 |
| 7,044,000 B2 | * | 5/2006 | Feller | 73/861.27 |
| 7,201,065 B1 | | 4/2007 | Feller | |

* cited by examiner

*Primary Examiner*—Jewel Thompson
(74) *Attorney, Agent, or Firm*—David Kiewit

(57) ABSTRACT

A time-of-flight ultrasonic flow meter uses transducers placed on streamlined heads of probes that are spaced out along a pipe. The placement of the transducers and probes is selected so that an acoustic signal can propagate between the transducers on the two probes along a path that involves at least one reflection from an internal surface of the pipe.

5 Claims, 4 Drawing Sheets

ULTRASONIC FLOW SENSOR USING TWO STREAMLINED PROBES

BACKGROUND OF THE INVENTION

1. Field of the Invention

The present invention relates to acoustic apparatus and methods for fluid flow measurement. More specifically, it relates to ultrasonic time of flight sensors configured as insertion probes.

2. Background Information

It is known in the flow measurement arts to configure a time-of-flight sensor comprising a pair of probes spaced apart along a flow direction, as shown schematically in FIG. 1. Generally, each of these probes has an ultrasonic transducer set perpendicular to the flow direction and facing another transducer on the other probe so as to define an acoustic beam extending along the flow direction. This arrangement samples only that portion of the fluid lying directly between the two probes.

Conventionally, these transducers constitute a flat face on the downstream side of the upstream probe and another flat face on the upstream side of the downstream probe. The bluff downstream face on the upstream probe is particularly problematic in that it facilitates the generation of vortices that can intercept the acoustic beam.

In his U.S. Pat. Nos. 7,044,000 and 7,201,065, the inventor provides ultrasonic time-of-flight flow sensors using quasi-helical acoustic beams that sample a greater fraction of the flowing fluid. These beams may extend between two transducers spaced apart along a flow direction and skewed with respect to that flow direction so as to reflect the beam off the inside walls of the pipe. In an embodiment depicted in FIG. 2, the two transducers are mounted on a single probe head. A drawback of this arrangement is that mounting the two transducers on a single probe head increases the effective diameter of the probe, thus requiring a larger fitting and a larger pipe opening for inserting the probe into the pipe. Another drawback is that the acoustic path length is less than what could be provided if the transducer spacing along the flow direction was increased beyond the limit set by the largest feasible fitting.

BRIEF SUMMARY OF THE INVENTION

One aspect of the invention is that it provides a method of measuring a flow rate of a fluid flowing in a pipe by measuring a time of flight of an acoustic signal propagating between upstream and downstream probes spaced apart along an axis of the pipe, This method uses a first acoustic transducer disposed on the upstream probe downstream of its axis and a second acoustic transducer disposed on the downstream probe upstream of its axis. The placement of the transducers and probes is selected so that an acoustic signal can propagate between the first and second acoustic transducers along a path comprising at least one reflection from an internal surface of the pipe.

Another aspect of the invention is that it provides a flow sensor for measuring a flow rate of a fluid flowing in a pipe. This sensor comprises upstream and downstream probes having respective probe axes. Each of the probes comprises a respective head portion streamlined along a respective elongation direction. The transducer is, of course, installed so that the elongation direction is parallel to or lying along the pipe axis. Each head portion comprises at least one transducer displaced a respective length along the elongation direction from the respective probe axis and skewed with respect to the respective elongation direction by a respective selected skew angle. The respective skew angles, lengths and pipe diameter are selected to define an acoustic beam extending between the upstream and downstream probes and reflecting at least once from an inside surface of the pipe when the upstream probe is inserted into the pipe so that each associated transducer is downstream of the upstream probe axis and the downstream probe is inserted into the pipe so that each associated transducer is upstream of the downstream probe axis.

Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided by some embodiments.

BRIEF DESCRIPTION OF THE SEVERAL VIEWS OF THE DRAWING

FIG. 6 depicts two acoustic beams extending between two pairs of transducers, where one transducer of each pair is mounted on a separate one of the two probes.

DETAILED DESCRIPTION OF A PREFERRED EMBODIMENT

Figure 1:
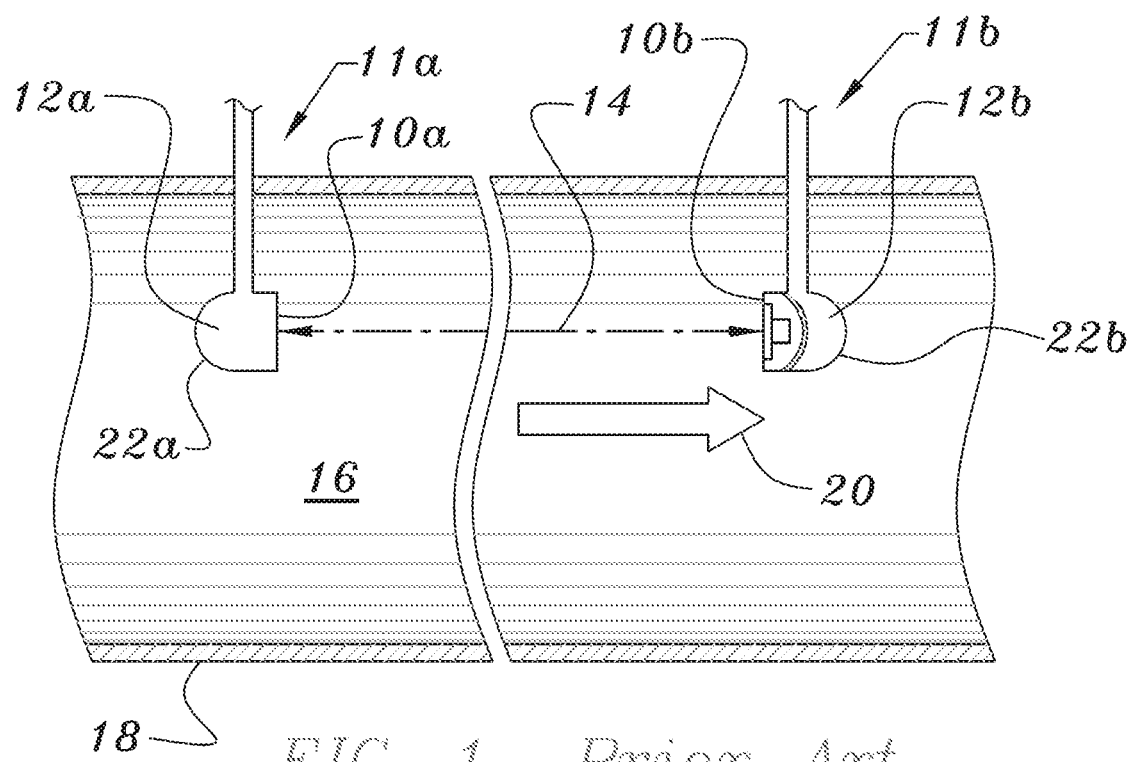
FIG. 1 is a partly schematic partly cut-away depiction of a prior art ultrasonic flow sensor in which an acoustic beam parallel to a flow direction extends between two probes.

The term "ultrasonic transducer", as used herein, stands for any sort of device that can use an electrical input to generate an acoustic output or, conversely, to use an acoustic input to generate an electrical signal output. In most of the cases of present interest, a transducer comprises a piezoelectric ceramic body mounted on one side of a window that has its opposite side wetted by a flowing fluid. The term "transducer" is used herein to denote either the piezoelectric element alone or a combination of the piezoelectric element with any of a window, a resonator, a damper, various adhesives used to hold a stack of elements together, etc.

The term "insertion probe" as used herein, denotes an item elongated along a probe axis and designed to be inserted into a pipe or other vessel so that a sensing element on, or closely adjacent, the inserted end of the probe is at a selected probe axial insertion depth and orientation with respect to that pipe or vessel. Although much of the ensuing discussion is directed toward in-field insertion of probes into a pre-existing pipe, it will be understood that an insertion probe could equally well be factory-installed in a pipe section that was then built into a run of piping. A "flow probe", as used herein, provides the conventional denotation of a portion of a flow sensor configured to be inserted into a pipe. When a pair of flow probes are inserted into a pipe so that a flow measurement direction, defined with respect to the probe, and perpendicular to the probe axis, is parallel to or collinear with the axis of the pipe, a raw flow signal from the flow probes is then a measure of the rate at which the fluid is flowing between the two probes.

The ensuing disclosure will describe apparatus operated to define acoustic beams traveling along paths comprised of straight line segments which may be skewed with respect to the pipe axis. Those versed in geometry will appreciate that in a limiting situation in which the individual straight line segments have infinitesimal length the path becomes a helix. Hence, some of the acoustic paths described herein will be referred to as having a quasi-helical shape. These quasi-helical acoustic beams are sometimes described as being propagated transverse to the pipe axis from a transducer. The reader will appreciate that in this context 'transverse' describes not only beams having a center line perpendicular to the pipe axis, but also beams that are angled away from the perpendicular so that the center line of the beam extends between transducers on two probes that are spaced apart along the pipe axis.

The acoustic energy paths, when projected onto a cross-section perpendicular to the axis of the pipe, approximate chordal paths. In a preferred embodiment of the present invention, where the insertion depth of the two probe heads is 25% of the pipe's diameter and the transducers generate and receive beams directed perpendicular to a probe axis, these paths define a quasi-helix that appears, in cross-section, like an equilateral triangle. That is, the path can conceptually be constructed by drawing an equilateral triangle, cutting through a midpoint of one side and then moving the cut ends of the triangle apart along a line perpendicular to the plane of the triangle by a selected amount corresponding to a flow measurement distance between transducers on the two probes. The associated transit time is responsive to the flow rates along those paths and the fluid flow intersecting those paths provides an approximation of the volumetric flow in the entire pipe. Hence, the volumetric accuracy is improved over what is offered by the single straight-line segment beam depicted in FIG. 1.

During installation of preferred probes the shaft seals of conventional insertion fittings can be loosened to allow an operator to move the stems into and out of the pipe and to rotate the stems about their axes into selected settings. These adjustments can assure that the sensing heads are disposed at a desired insertion depth and that the flow measurement direction is parallel to or coincident with the flow axis. Those skilled in the flow measurement arts will recognize that many mechanisms and approaches can be used to adjust both the depth and the rotational settings.

Turning now to FIG. 1, one finds a prior art arrangement using transducers 10a, 10b mounted on two separate probes 11a, 11b. An acoustic beam 14 generated by these transducers can be used to measure the rate at which a fluid 16 flows through a pipe 18, where the flow direction is indicated by a white arrow 20.

Although the upstream end 22a of the upstream probe head 12a and the downstream end 22b of the downstream probe head 12b in FIG. 1 can be streamlined, the transducers 10a, 10b generally present a flat surface perpendicular to the flow. At high flow rates, the bluff profile of the transducer 10a in the downstream end of the upstream probe head 12a can contribute to formation of vortices that both reduce the signal to noise ratio of the device and that increase the rate measurement error when those vortices are intercepted by the acoustic beam 14. Moreover, the vortices generated by non-streamlined probe heads can cause mechanical vibration that further increases measurement error and that, in extreme cases, can lead to mechanical failure.

Figure 2:
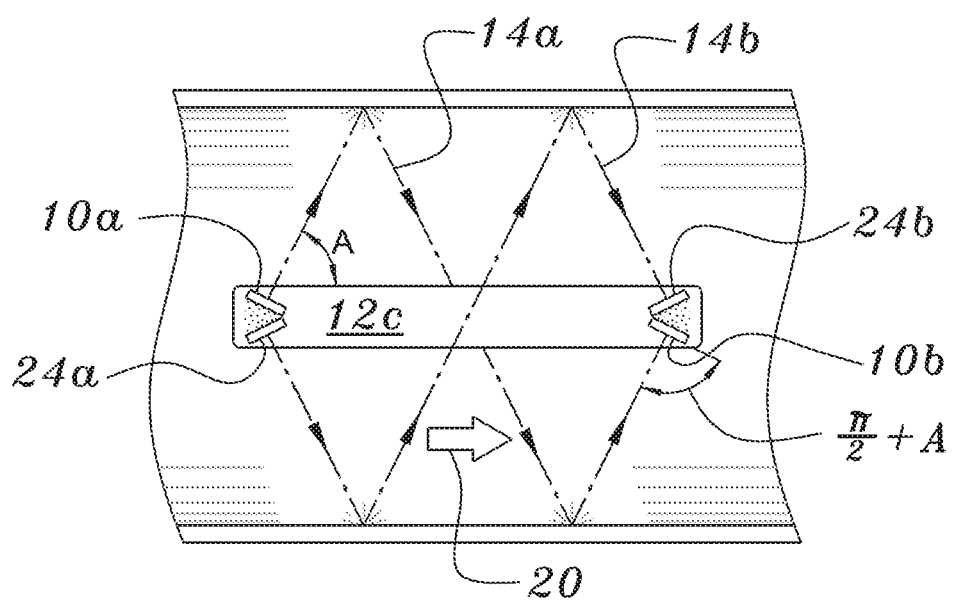
FIG. 2 is a schematic depiction of the inventor's earlier ultrasonic flow sensor in which two pairs of transducers, mounted on a single probe head and skewed with respect to a flow direction, are used to define respective quasi-helical acoustic beams.

In his U.S. Pat. Nos. 7,044,000 and 7,201,065, the inventor provides ultrasonic time-of-flight flow sensors using quasi-helical acoustic beams that sample a greater fraction of the flowing fluid. In one embodiment of those teachings, as depicted in FIG. 2, paired transducers 10a, 10b; 24a, 24b are disposed near the ends of a probe head 12c that is elongated along the flow direction 20. This approach allows one to avoid having a bluff transducer window aligned perpendicular to the flow and greatly reduces problems of flow and vortex generation. Moreover, the acoustic beams 14a, 14b undergo several reflections from the pipe in passing between two paired transducers. This can provide beams sampling the flow at a variety of radial positions in the pipe, as shown, for example, in FIG. 7 of U.S. Pat. No. 7,201,065.

The difference in propagation time between the upstream and downstream transmissions is proportional to the distance along the flow axis between the two transducers in communication with each other. A greater distance has the advantage of producing a larger time difference so that sources of measurement error such as electronic processing or transducer drifts are correspondingly reduced. When both transducers are mounted on a single insertion probe, they must be relatively close to each other for the practical reason of keeping the opening in the pipe that the probe is mounted through relatively small. However, if two separate probes are used, that spacing limitation does not exist and the probes may be spaced to provide the best performance for a given application.

As an example, one may consider a probe which must pass through a one inch opening. If the probe head has a configuration of the sort shown in FIG. 2 the transducers would be spaced about 0.8" apart along the flow axis. When two separate probes are used they might easily be spaced 8" apart, thereby increasing the transit time by a factor of ten and correspondingly reducing the electronic processing and transducer drift errors by a similar factor. It is also noted that the unlimited spacing between the two probes enables a lower acoustic frequency to be used in order to provide a system that is more tolerant of pipe surface factors and that may have electronic processing advantages.

Figure 3:
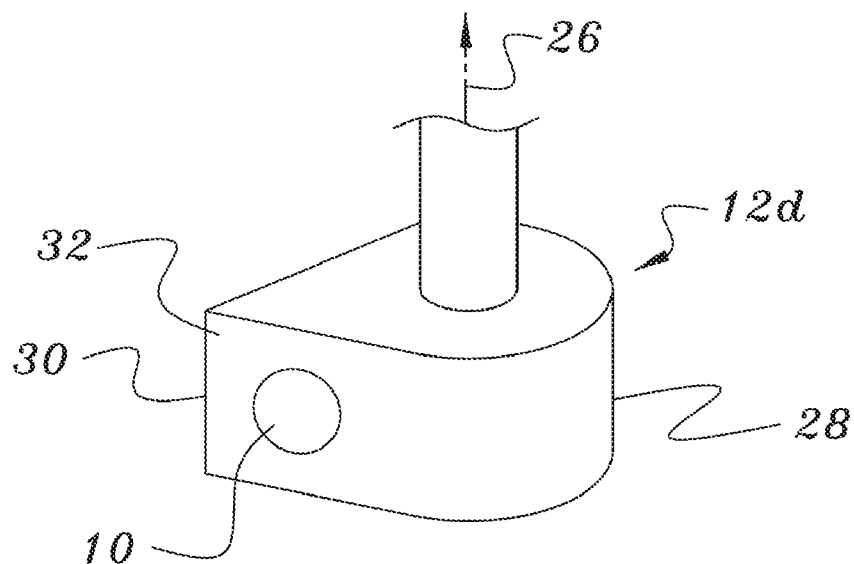
FIG. 3 is a perspective view of a streamlined probe head having a transducer mounted on a relatively flat surface thereof.

Turning now to FIG. 3, one finds a schematic depiction of a preferred flow measurement probe head 12d of the invention. The teardrop-shaped head 12d is elongated and streamlined along an elongation direction perpendicular to an axis 26 of the probe so that either a curved 28 or a chisel-pointed 30 end of the probe head 12d can face into the flow. At least one transducer 10 is mounted on one of the angled 32 faces of the probe head so that it can generate and receive acoustic impulses directed along a beam skewed with respect to the flow direction.

Figure 4:
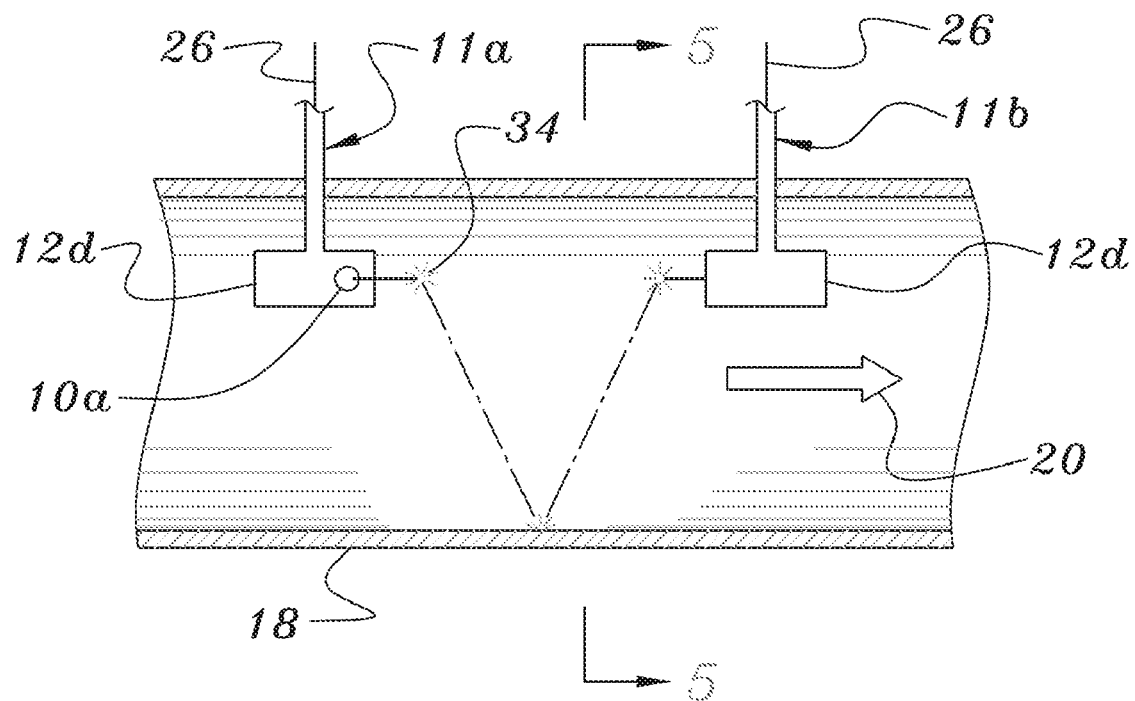
FIG. 4 is a schematic sectional view of two probes of the invention, the view taken in a plane including an axis of the pipe and the stems of the two probes.

A pair of probes of the sort depicted in FIG. 3 can be spaced apart along a pipe, as depicted in FIG. 4. In this arrangement, a first transducer 10a mounted on the upstream probe 11a, and which is downstream of its probe axis 26, communicates with a second transducer 10b mounted on a face of the downstream probe 11b. The transducer 10b is hidden in the view of FIG. 4, but is visible in FIG. 5. The transducer 10b is mounted so that it is upstream of the downstream probe axis. This provides a quasi-helical beam 14, of the sort taught by the inventor in his U.S. Pat. Nos. 7,044,000 and 7,201,065, but does so without the restriction on beam length that was inherent in the earlier design.

It may be noted that the quasi-helical beams of interest involve reflections from an inner surface of the pipe 18. In the interest of clarifying just how the beam is laid out, each reflection from the inner surface of the pipe is indicated with a starburst symbol 34 in FIGS. 4-6.

Figure 5:
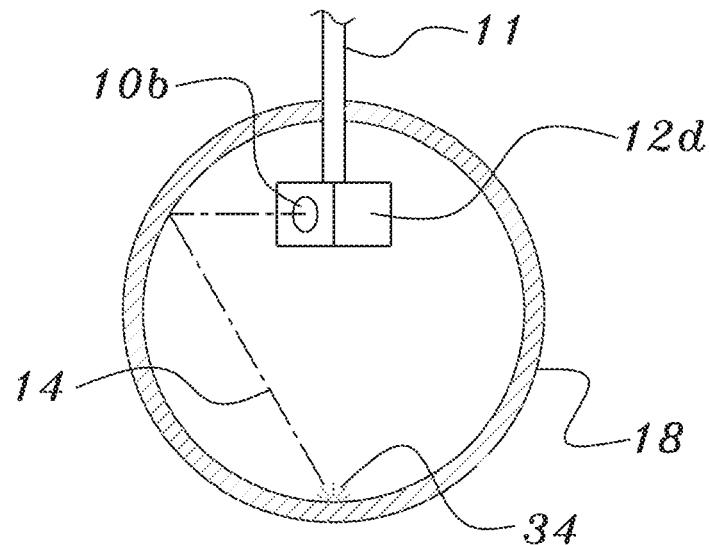
FIG. 5 is a schematic cross-section depicting a streamlined probe installed in a pipe and generating an acoustic beam completed at a second transducer on a second probe. The second probe and a portion of the acoustic beam have been removed by the sectioning operation indicated by the double headed arrow 5-5 in FIG. 4.

A different view of half of the quasi-helical beam of FIG. 4 can be seen in FIG. 5, which is a view along the axis of the pipe in a section indicated by 5-5 in FIG. 4. Because the plane of section truncates the beam 14, only a portion of the beam appears in FIG. 5.

Figure 6:
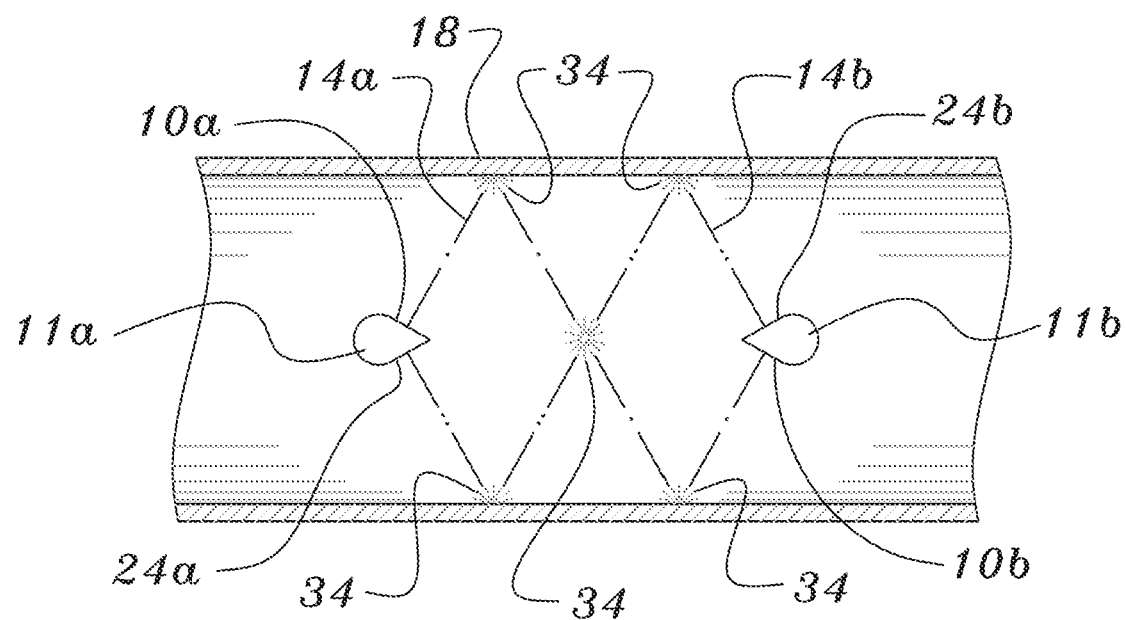
FIG. 6 is a schematic sectional view taken in a plane including the axis of the pipe and perpendicular to the stems of two probes.

The depictions of FIGS. 4 and 5 show only one transducer 10 mounted on each probe head 12d so as to generate a single acoustic beam 14 extending between the probes. A preferred embodiment of the invention provides two transducers 10a, 10b; 24a, 24b, on each probe 11a, 11b, thus allowing for two quasi-helical beams 14a, 14b, as depicted in FIG. 6. As the inventor has taught in his U.S. Pat. Nos. 7,044,000 and 7,201,065, this arrangement can yield more accurate measurements when rotational flow components are present.

The transducers in FIG. 6 can also be angled for each of the two beams to reflect three times from an internal surface of the pipe so that the two beams are angularly displaced from each other so as to sample different portions of the flow path. For example, the beams can have a difference in angular displacement of sixty degrees, yielding an arrangement similar to that depicted in FIG. 7 of the inventor's U.S. Pat. No. 7,201,065. The flow rates derived from the two pairs of transducers can then be averaged to cancel the effects of a rotating flow component.

It is further noted that a large rotating flow component reduces the dynamic range of the instrument and could eliminate the single probe configuration of the inventor's U.S. Pat. Nos. 7,044,000 and 7,201,065 from consideration in some applications. In the dimensional example above, the effect of the rotating flow component that was measured by the configuration of FIG. 2 would be reduced by a factor of ten if one used the two-probe configuration of FIG. 6.

Figure 7:
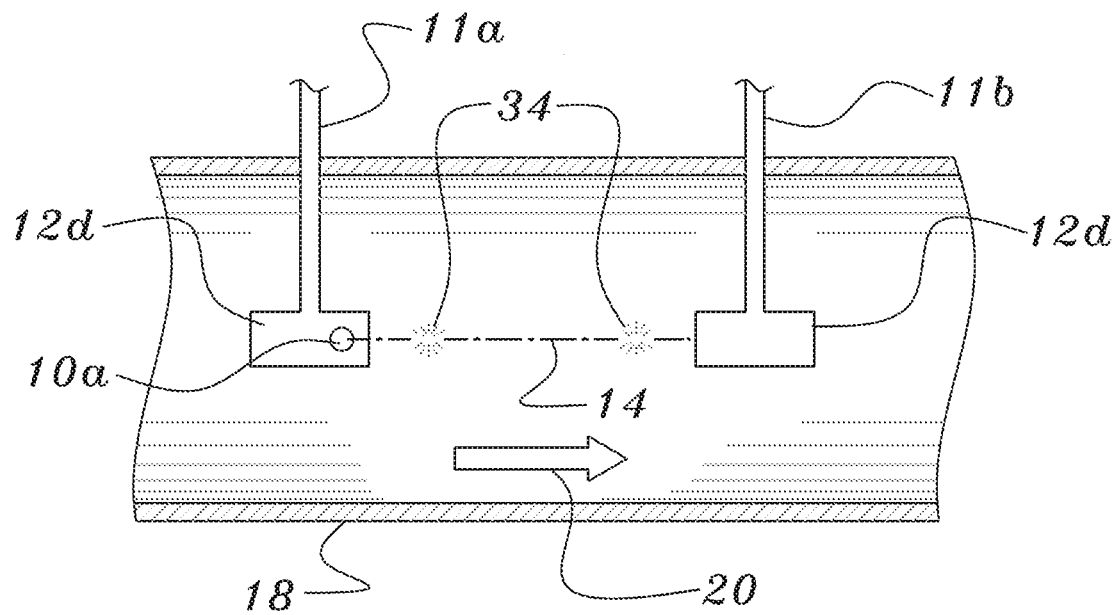
FIG. 7 is a schematic sectional view similar to that of FIG. 4, but in which the transducers are set in a diametral plane of the pipe.
Figure 8:
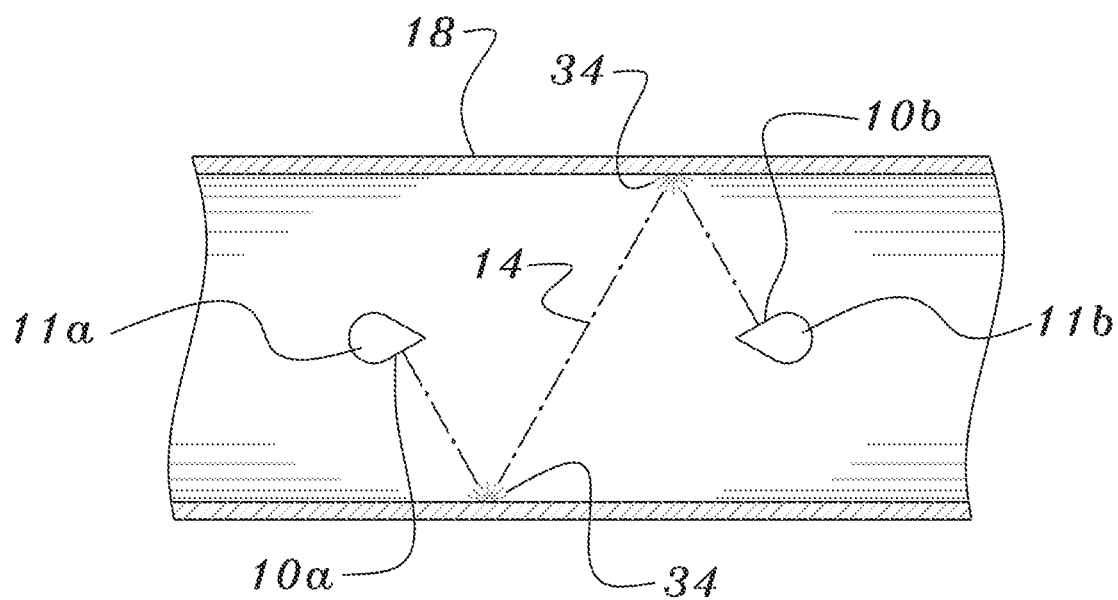
FIG. 8 is a schematic sectional view, similar to that of FIG. 6, but in which the transducers are set in a diametral plane of the pipe.

In circumstances in which the flow profile varies relatively little across a pipe, as may be the case when a flow measurement is made in a long, straight run of piping, a simpler, lower cost embodiment of the invention, shown in FIGS. 7 and 8, may be applicable. In this case, two probes 11a, 11b are configured with a single transducer on each probe head 10a, 10b, and the probe heads are set in a diametral plane of the pipe. In this arrangement, two transducers on respective probes communicate with each other along a beam 14 making two reflections from an inner surface of the pipe. These acoustic beams traverse the entire pipe diameter to take into account the full pipe profile for the measurement of volumetric flow rate. As noted, because these acoustic beams do not trace out a rotating pattern in the pipe, this arrangement is not responsive to rotating flow components.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. A flow sensor for measuring a flow rate of a fluid flowing in a pipe having a diameter, the sensor comprising upstream and downstream probes having respective probe axes, each probe comprising
    a respective head portion streamlined along a respective elongation direction, each head portion respectively comprising
    at least one transducer having a respective center displaced a respective length along the elongation direction from the respective probe axis and skewed with respect to the respective elongation direction by a respective selected skew angle;
    wherein the respective skew angles, respective lengths and the pipe diameter are selected to define an acoustic beam extending between the upstream and downstream probes and reflecting at least once from an inside surface of the pipe when the upstream probe is inserted into the pipe so that each associated transducer is downstream of the upstream probe axis and the downstream probe is inserted into the pipe so that each associated transducer is upstream of the downstream probe axis.

2. A method of measuring a flow rate of a fluid flowing in a pipe by measuring a time of flight of an acoustic signal propagating between upstream and downstream probes spaced apart along an axis of the pipe, the method comprising the steps of:
    providing a first acoustic transducer disposed on the upstream probe downstream of an axis thereof;
    providing a second acoustic transducer disposed on the downstream probe upstream of an axis thereof; and
    generating the acoustic signal propagating between the first and second acoustic transducers along a path comprising at least one reflection from an internal surface of the pipe.

3. The method of claim 2 further comprising:
    providing a third acoustic transducer disposed on the upstream probe downstream of an axis thereof;
    providing a fourth acoustic transducer disposed on the downstream probe upstream of an axis thereof; and
    generating a second acoustic signal propagating between the third and fourth acoustic transducers along a second path comprising at least one respective reflection from the internal surface of the pipe.

4. A method of measuring a flow rate of a fluid flowing in a pipe by measuring a time of flight of an acoustic signal propagating between upstream and downstream probes spaced apart along an axis of the pipe, each of the probes rotatable about a respective probe axis into a selected rotational setting, each of the probes insertable into the pipe to a respective insertion depth, the method comprising the steps of:
    providing a first acoustic transducer disposed on the upstream probe;
    providing a second acoustic transducer disposed on the downstream probe; and
    selecting the respective insertion depths and rotational settings of the upstream and downstream probes so that the acoustic signal propagates between the first and second acoustic transducers along a path comprising at least one reflection from an internal surface of the pipe.

5. The method of claim 4 further comprising:

providing a third acoustic transducer disposed on the upstream probe;

providing a fourth acoustic transducer disposed on the downstream probe; and generating a second acoustic signal propagating between the third and fourth acoustic transducers along a second path comprising at least one respective reflection from the internal surface of the pipe.

* * * * *